(12) United States Patent
Kalke

(10) Patent No.: US 7,853,056 B2
(45) Date of Patent: Dec. 14, 2010

(54) METHOD FOR LIMITED ANGLE TOMOGRAPHY

(76) Inventor: Martti Kalke, Alipostinkuja 6, Tuusula (FI) FI-04300

(*) Notice: Subject to any disclaimer, the term of this patent is extended or adjusted under 35 U.S.C. 154(b) by 1084 days.

(21) Appl. No.: 11/292,318

(22) Filed: Dec. 1, 2005

(65) Prior Publication Data
US 2007/0127801 A1    Jun. 7, 2007

(51) Int. Cl.
*G06K 9/00* (2006.01)
(52) U.S. Cl. .......................... 382/128; 378/4
(58) Field of Classification Search ............... 382/100, 382/128, 129, 130, 131, 132, 133; 128/922; 378/4–27
See application file for complete search history.

(56) References Cited

U.S. PATENT DOCUMENTS

| | | | | |
|---|---|---|---|---|
| 4,053,779 A | * | 10/1977 | Barbieri | 378/9 |
| 4,506,327 A | * | 3/1985 | Tam | 378/5 |
| 6,002,738 A | * | 12/1999 | Cabral et al. | 378/4 |
| 6,768,782 B1 | * | 7/2004 | Hsieh et al. | 378/8 |
| 6,907,102 B1 | * | 6/2005 | Sauer et al. | 378/19 |
| 7,251,306 B2 | * | 7/2007 | Sauer et al. | 378/4 |
| 2004/0264634 A1 | * | 12/2004 | Claus et al. | 378/21 |
| 2008/0205717 A1 | * | 8/2008 | Reeves et al. | 382/128 |

* cited by examiner

*Primary Examiner*—Anand Bhatnagar
(74) *Attorney, Agent, or Firm*—Andrus, Sceales, Starke & Sawall, LLP

(57) ABSTRACT

A tomographic reconstruction method or device for calculation of a 3-dimensional image data or 2-dimensional slice from a limited amount of 2-dimensional or 1-dimensional projection images using iterations to calculate 3D image elements, comprising transformation of measured data to transform domain.

4 Claims, 6 Drawing Sheets

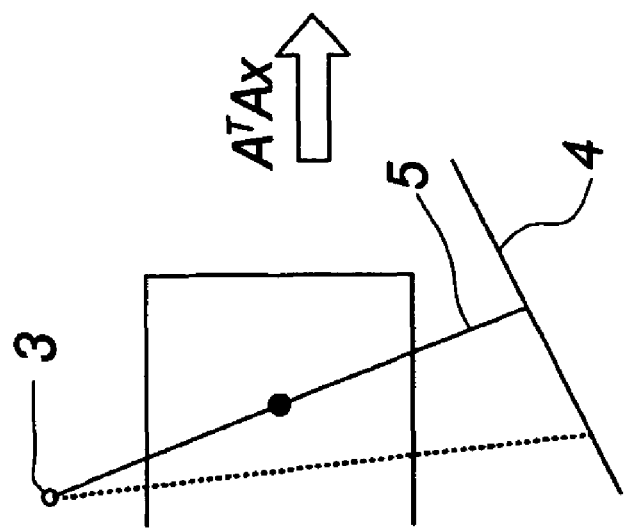
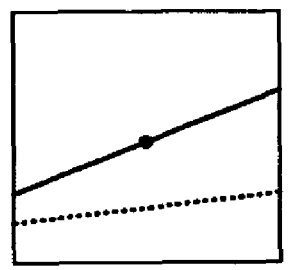
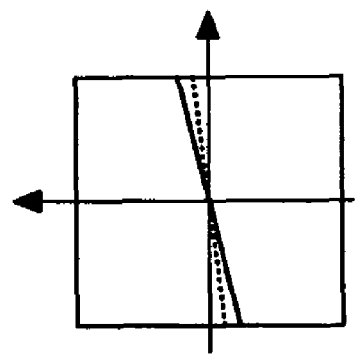
*Fig. 2A*     *Fig. 2B*     *Fig. 2C*

METHOD FOR LIMITED ANGLE TOMOGRAPHY

The invention relates to limited angle computer tomography. Especially, advantageously the method according invention is used for X-ray or gamma ray tomography.

Unlike conventional X-ray imaging, 3D (three-dimensional) imaging enables measuring distances and defining exact structures of the objects. For example in dental implantology, it is critical for the firm attachment of the implant to use optimal screw size and therefore measure optimal depth and angle for the screw hole. If the bone implant screw is too short, the implant will be loose. On another hand, if the hole is drilled too deep, the mandibular nerve could be damaged. Other example of the benefit in 3D imaging is avoiding the superposition problem (i.e. problem caused by overlapping issues) in diagnostic imaging.

So far the medical 3D imaging has been associated to CT (computed tomography) algorithms and systems. The basic philosophy of CT imaging is to measure the attenuation in each volume element (voxel) cross the object of interest. This approach requires specially designed system with exact mechanical accuracy and over-sampling of the issue of interest, which means in practice high dose and high device costs comparing to 2D (two-dimensional) imaging. Therefore, the use of CT imaging is now-a-days limited to serious diseases and it is typically utilized only in big hospital districts which eventually limits the smooth patient workflow.

Lately there has been increasing interest in dedicated dental cone beam CT-based systems (CBCT). Since the dental CBCT systems are based on same algorithms and philosophy as non-dedicated CTs, these CBCT systems have also the same drawbacks than non-dedicated CTs. Specially, as in dental CBCT system the patient is sitting (instead of laying) during the exposure, there is even more patient motion artifacts in the images than in non-dedicated CT. It is well known that these kinds of artifacts cannot be handled in current CT algorithms. Moreover, despite the fact that the dedicated dental CBCTs are less expensive than conventional CTs, the total cost of the dental CBCT device is typically more than ten times the cost of standard digital panoramic device.

The object of the invention is to improve an algorithm, which could calculate a 3D model from small number of images and could handle incomplete imaging geometry and intensity information in reasonable calculating time. With that kind of construction, the 3D images could be taken by using any existing digital X-ray system, including dental panoramic and intra oral systems or mammography system. Furthermore, since there would be no need for high dose or mechanical accuracy, 3D imaging could be expanded to any medical study and it would fit smoothly into clinical workflow.

Also the invention aims to enable lower cost of the hardware for calculating the tomography. Present limited angle tomography is either very slow or it needs expensive dedicated hardware, and still with for example large memory display controller hardware for calculations the calculating time is too slow for smooth clinical workflow. The aim is to use standard affordable computer systems and still get the results much faster than before.

DESCRIPTION OF THE FIGURES

FIG. 1A shows a guideline for drilling a hole 2 for a dental implant. It is difficult to know from the X-ray picture 1B the location of the mandibular nerve 1. The cross-section of the same jaw is presented as tomography image in FIGS. 4A, 4B, and 4C. The advantage of the tomography is clear; the nerve is clearly visible in all the tomography images made with method according the invention, even with worse selection of parameters. The invention enables much more useful imaging and makes the drilling operation safer, and the image can be achieved faster and with cheaper equipment than before. This is only one example of usefulness of fast, cheap, and widely applicable limited angle tomography according the invention. Biopsy in mammography is another especially advantageous use in addition to all the present uses of computer tomography, as the method enables smaller doses with acceptable image quality and much faster calculation than in present methods.

STATE OF ART

Arithmetic Reconstruction Technique (ART)

Figure 1A:
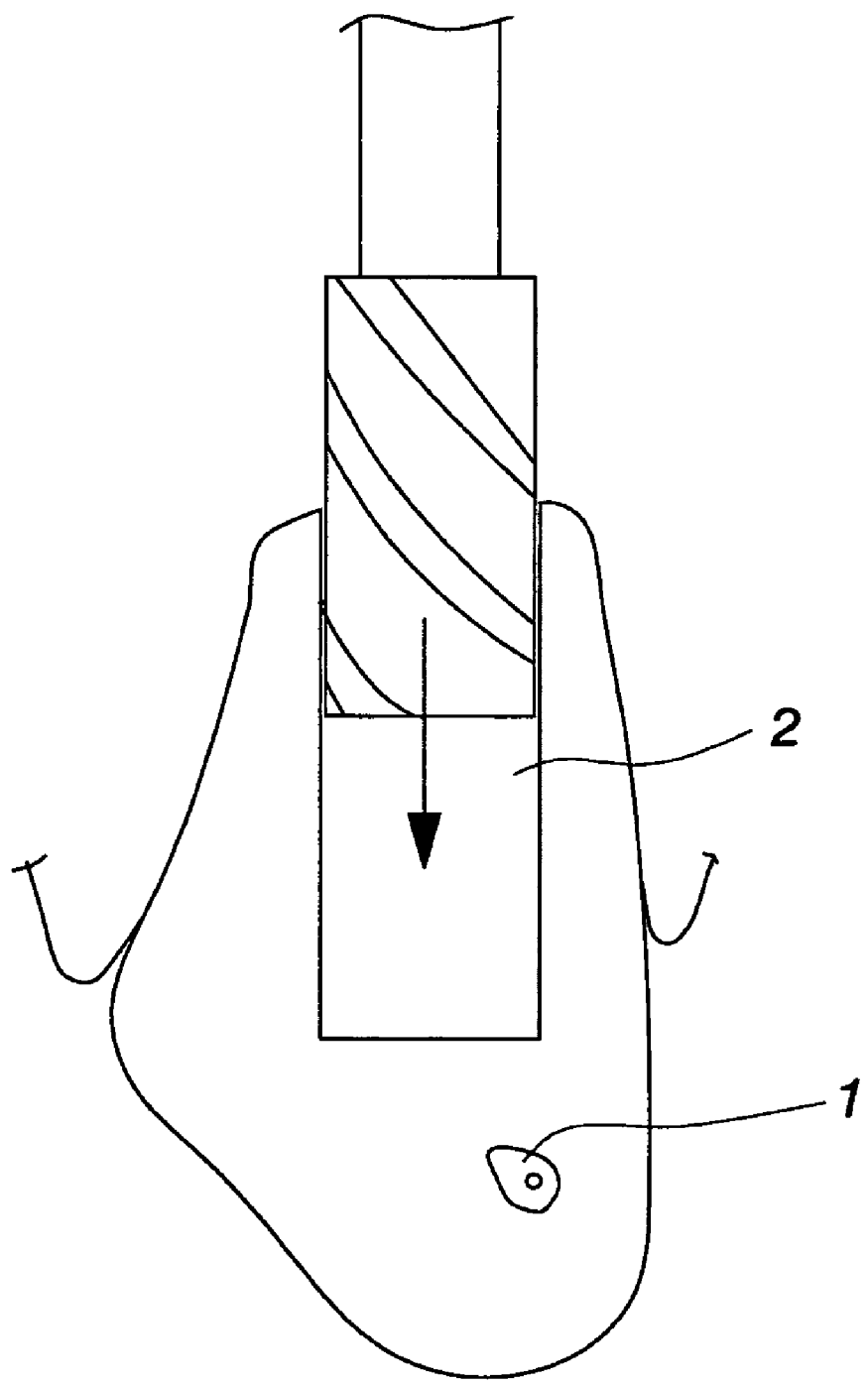
FIG. 1A Guideline of drilling a hole for implant.
Figure 1B:
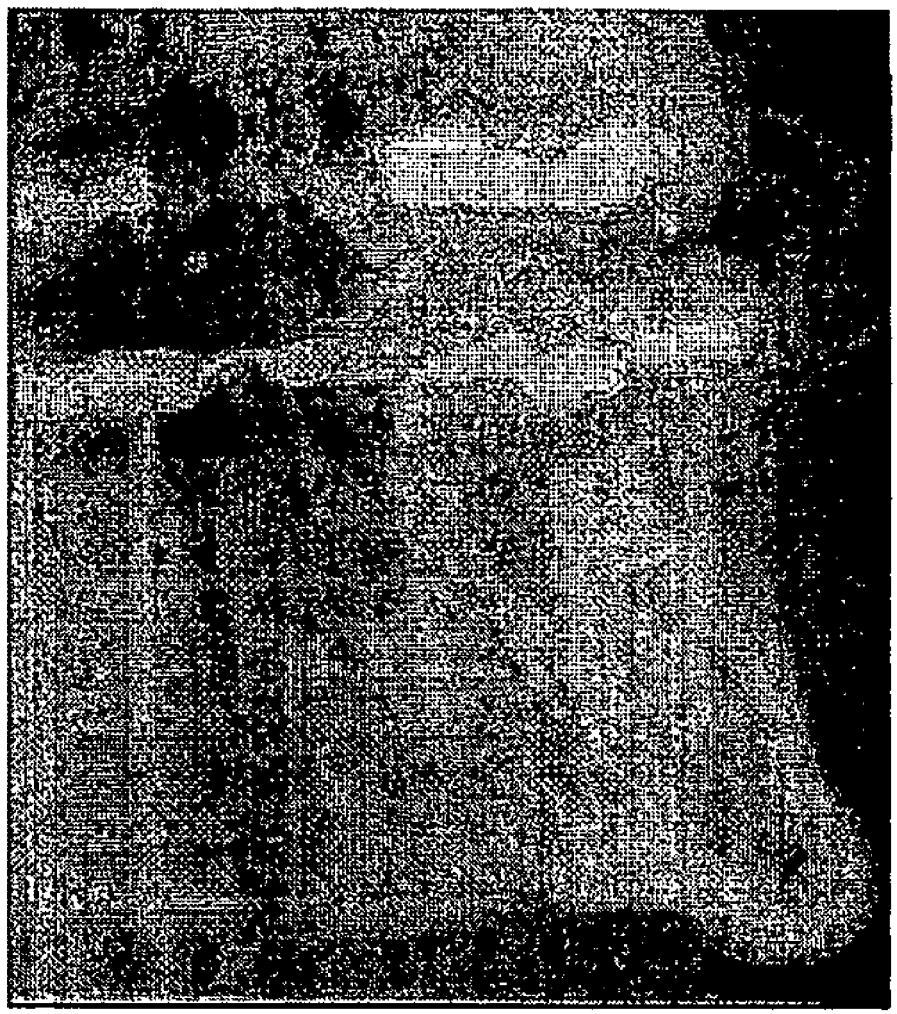
FIG. 1B Typical X-ray image of the same area
FIG. 2A to 2C The Point Spread Function (PSF) and its Fourier transform in non-affine imaging geometry.

One of the most used back projection algorithm in limited angle cases is called Arithmetic Reconstruction Technique (ART). ART is a common name for set of iterative reconstructions where system is modeled with number of linear equations. The ultimate purpose of the ART calculation is to solve these equations.

In limited angle problem a relatively small number (typically from 7 to 11) X-ray images are taken from different angles from the same object. Since there are fewer measurements than variables and contrast and spatial limited accuracy, it is impossible to define the object non-ambiguously. Therefore, instead of giving exact solution, the function of the ART is to minimize the error between the measurement (projection images) and projected volume. This kind of underdetermined system is commonly known as an ill-posed system.

The ART algorithm is always a heavy iterative algorithm and the known ART methods are too slow to calculate with present computers. Even the method itself would give satisfactory result; the calculating time is limiting clinical use and there have been no commercial devices available yet.

In known ART algorithm we combine the volume $x \in R^3$ and the measurement $m \in R^2$ by using geometry matrix $A: R^3 \rightarrow R^2$ and volume. If we ignore the noise, we can say $$m = Ax \tag{2.1}$$

where m is the measured values in matrix, A presents the imaging geometry matrix and x is the 3D presentation of the object. Typically the matrix A is not formed as a matrix, because it is enormously large and sparse. The A is usually presented as a set of rules that are applied for each element when needed. The purpose of reconstruction is to define the x when the m is known. Hence the $A^{-1}$ does not exist; we need a process to minimize the error between the measurement m and projected volume Ax. However, in X-ray imaging we only know the sum cross the attenuation and therefore, it is not appropriate to use directly the equation $\epsilon = Ax - m$ for likelihood error. Instead of that, we multiply the equation 2.1 by $A^T: R^2 \to R^3$ from left-hand side.

$$A^T m = A^T A x \qquad (2.2)$$

The operator $A^T$ back-projects the measurements into the volume and x is multiplied by operator $A^T A: R^3 \to R^3$. Here $A^T A$ defines the freedom for x cross the beam (i.e. only the sum cross the beam has to match the measurement—not single values). Now we can refine the likelihood error more sensible way $$\epsilon = A^T A x - A^T m \qquad (2.3)$$

If we update the guess x by subtracting the attenuated error from the guess on each iteration round, we get an iterative process which minimizes the error $\epsilon$, i.e.

$$x_{i+1} = x_i - \lambda \epsilon_i \qquad (2.4)$$

where i is the iteration round and $\lambda$ is the relaxation parameter ($0 < \lambda << 1$). Since it is more effective to do the iteration by using one projection image per iteration round, we rather define $$x_{i+1} = x_i - \lambda A_k^T (A_k x_i - m_k) \qquad (2.5)$$

This is one of the most known form of ART. Here k is the projection number (i=Nk, N$\in$N$_+$). The number N is the number of iterations.

Problem of ART Algorithm and its Efficiency in Computer Iteration

The problem of ART algorithms is long computing time. The main reason for that is the non-optimized PC architecture for the sparse operations like $A_k x_i$. Technically speaking, the bottleneck in PC architecture is the bus between the main memory (RAM) and the microprocessor. Several architectural fixes have been done to solve that problem. One standard solution for this problem is method called cache, which is a buffer between the memory and the microprocessor. The purpose of the cache is to make sophisticated guess for the next access location on the memory. This is extremely powerful when same or next memory location is accessed several times. However, since matrix A is a sparse matrix and not affine, the cache fails in most of the cases. The effect of the cache is defined by hit rate factor. In typical ART calculation, the cache hit rate is low, which leads to longer memory access times and finally, to time consuming iteration rounds. This phenomenon does not depend whether the volume is updated voxel-by-voxel or using back projection cross the beam. Also there is no cheap computer architecture for fast and random memory access to large memory, the access time to very large memory is always considerably longer than the processors handling time for the data. So there is not expectable in near future hardware solution for the problem.

Method According to the Invention in Affine Imaging Geometry

The invention solves the above mentioned problem with low computer cache hit rate and it even enables distributed calculation. The invention uses an iterative algorithm, which minimizes the likelihood in the frequency domain instead of spatial domain as in prior art. Typically the frequency behavior of the system is defined by calculating Fourier transform of systems PSF (Point Spread Function). In affine case (i.e. all x-ray beams are parallel) $A^T A$ can be considered as a convolution and consequently the PSF of the $A^T A$ can be defined. Now we can transform equation 2.5 to frequency domain $$X_{i+1} = X_i - \lambda (F_k \otimes x_i - M_k) \qquad (4.1)$$

where $F_k = FFT(A_k^T A_k)$, $M_k = FFT(A_k^T m_k)$ and $X_i = FFT(x_i)$. Despite the fact that we need to calculate the FFT, as well as $A^T m$, before the iteration is this method significantly faster than using equation 2.5, because the voxel-wise multiplying is applied (marked with $\otimes$) and therefore corresponding voxels are on same location and the cache would speed-up the process dramatically. However, in non-affine case the PSF varies in function of space and therefore it is impossible to define the exact convolution kernel for $A^T A$. Therefore, this type of approach is limited only to affine cases.

FIG. 2A presents a typical non-affine imaging geometry and a schematic presentation of the $A^T A$ and the Fourier transform after FFT. This non-affine geometry is typical for a normal X-ray device, and therefore we need to solve the problem in more general case. Radiation source 3 is a point source, and detector 4 receives the radiation beams 5.

Method According to the Invention for Arbitrary Imaging Geometry

As we show earlier the straight forward Fourier conversion is limited only in affine cases. Therefore we have to develop another approach for arbitrary geometry. Projection $m \in R^2$ from the object $x \in R^3$ can be defined as follows:

$$m(v') = \int_L x(v) \qquad (5.1)$$

where x(v) is (logarithm of) attenuation in point $v \in R^3$ and $v' \in R^2$ is the corresponding projection point. Fourier transform of the measurement m is $$M(\omega_1) = \int_A \int_L x(v) \exp(-i 2\pi \omega^T v') \qquad (5.2)$$

where A is the area in detector m. On the another hand, the Fourier transform of the object is $$X(\omega_2) = \int_V x(v) \exp(-i 2\pi (\omega_2^T v)) \qquad (5.3)$$

where V is the volume. Notice that $\omega 1 \in R^2$ and $\omega 2 \in R^3$.

Figure 3:
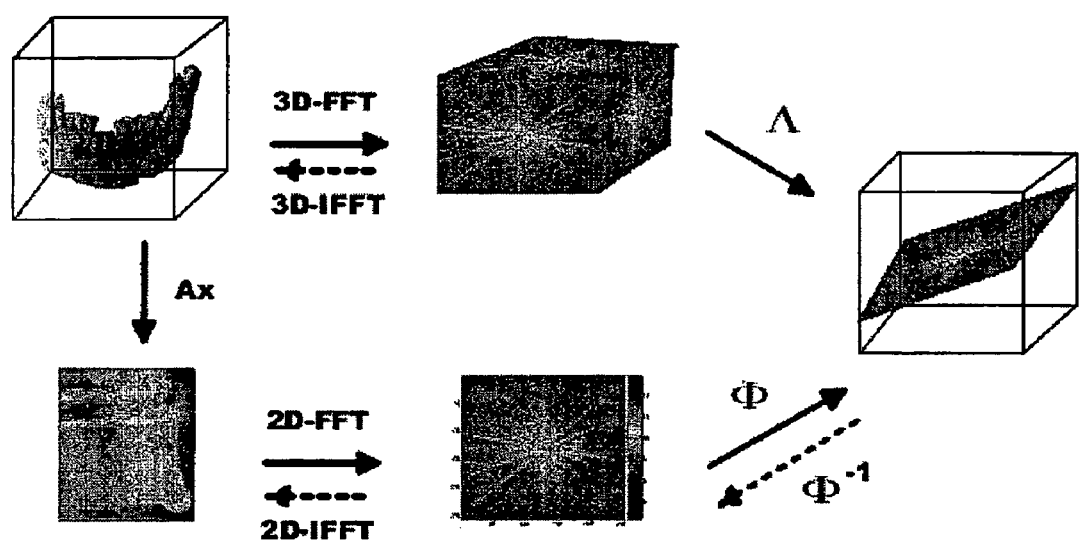
FIG. 3 The relation between FFT, $\Phi$, and $\Lambda$, showing their relation in a method according the invention.

To compare M and X in equations 5.2 and 5.3 we define two new operators $\phi: R^2 \to R^3$ and $\Lambda: R^3 \to R^3$ so that equivalency $\phi(M(\omega 1)) = \Lambda(X(\omega 2))$ exists like shown in FIG. 3.

$\phi$ is an operator which re-maps the projection image to volume space in frequency domain. Therefore, by using equation 2.2, we elaborate the operator $\phi$ $$\Phi(m_k) = FFT(A^T m_k) \qquad (5.4)$$

This means that the operator $\phi$ defines the correlation between the volume and the measurement in frequency domain based on simple back-projection. Despite $A^T m$ fulfills the mathematical equations, it typically (almost always) gives the wrong solution, which can be seen as a blurring effect in reconstruction. However, this blurring can be minimized (or at least, controlled) by the operator $\Lambda$.

The purpose for the operator $\Lambda$ is to cut-off all the frequencies outside region defined by $\phi$. In addition, $\Lambda$ can be considered as a probability matrix; when the corresponding frequency in $\phi(m_k)$ is known, the value is set to 1, otherwise it is 0. Furthermore, if the geometry is not well-known the values can be set also between 1 and zero. Notice that $\Lambda_i$ has the same dimension than $X_i$ and, unlike $\phi$, $\Lambda$ itself is an irreversible operator.

Now we can define the ART equation respective to equation 2.5 in Fourier domain.

$$X_{i+1} = X_i - \lambda \Lambda_k \otimes (X_i - \Phi(m_k)) \qquad (5.5)$$

Benefits against the spatial ART (ref equation 2.5) are the voxel-wise multiplying and the information accumulation. For example, in cone beam geometry the well-known frequencies are located on a surface of a ball. The radius of the ball corresponds the SID (source to image distance) and the center point corresponds with the X-ray source point respectively. In fact, this rule is valid in any one-shot imaging geometry.

Test Results

Figures 4A, 4B, 4C:
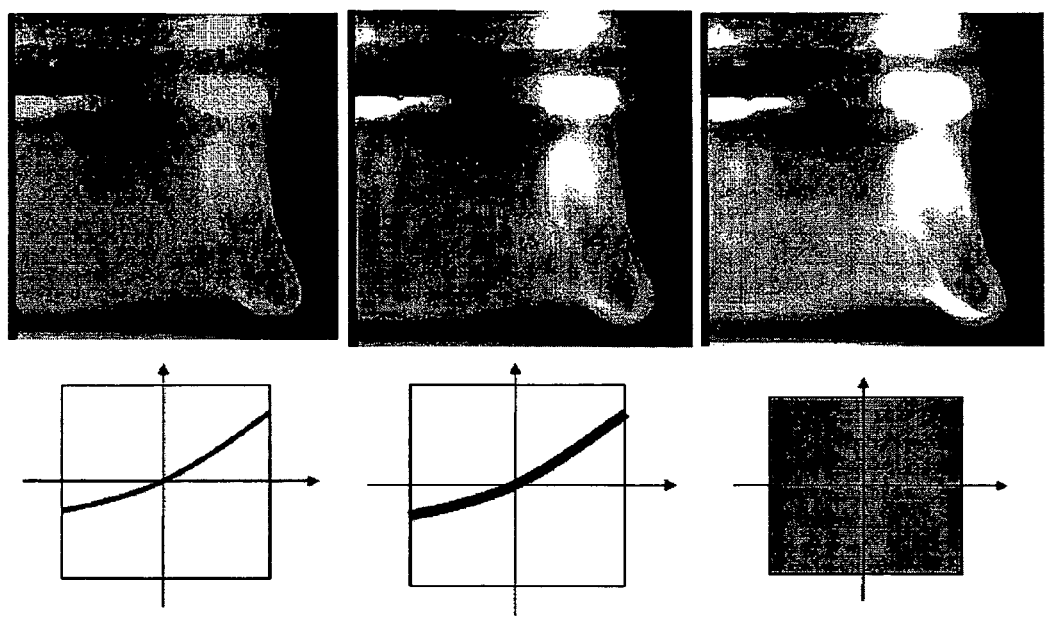
FIG. 4A to 4C Calculation results of clinical test according the invention with different parameters of the jaw in FIG. 1B.

FIG. 4 shows cross-section of jaw calculated with a method according the invention and corresponding Λ on frequency domain. FIG. 4A is used with SID tolerance of 4 mm, 4B used 8 mm and 4C used Λ matrix of ones. Note that the Λ is here described in 2D for simplification.

Figure 5:
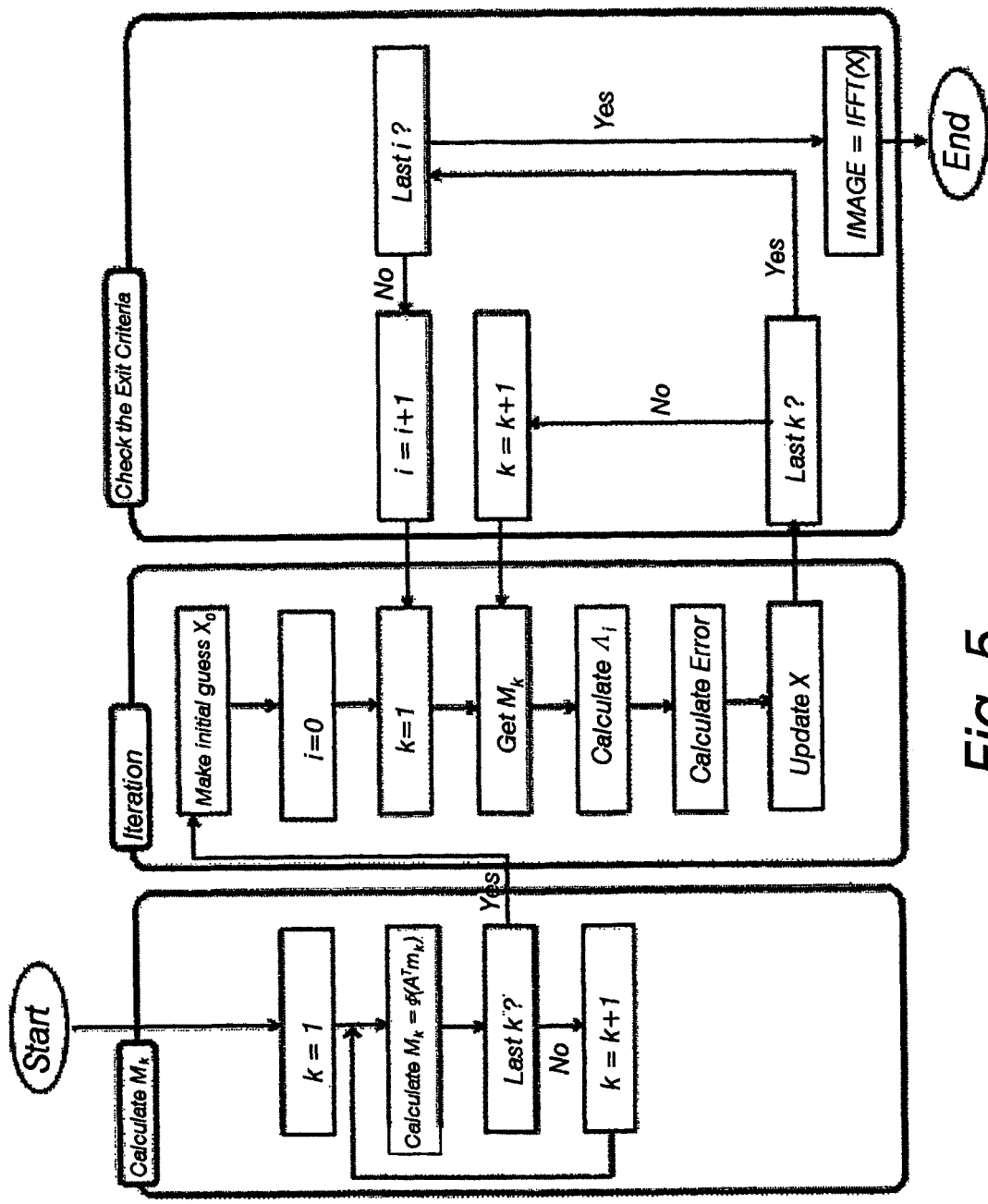
FIG. 5 The block diagram of a preferred embodiment of the method according the invention using Fourier transformed image iteration.

FIG. 5 shows the block diagram of the imaging algorithm used in the test. The flow chart is presented only as an example of one embodiment. The iteration itself is quite alike as in the known ART algorithms, only done in the frequency domain to avoid the cache misses that are unavoidable in conventional ART algorithm. Also other transforms than FFT may be used to convert to the frequency domain, the only requirement for the transform algorithm is that there is an inverse transform back to spatial domain and the iteration can be made in the frequency domain in reasonable way. The method according the invention is not limited to the X-ray. Other forms of radiation may be for example gamma rays, any particle radiation, or even UV, IR or visible light. The possible type radiation depends on the object.

The FIG. 4 shows result of the clinical case. In this case 11 images were taken from about 40 degree aperture. The size of the image was 512×512@ 1.8 mm pixel size. The reconstructed volume was 256×256×256 voxels and size of 60×60× 60 mm. The reconstruction time was about 8 minutes (7 minutes to calculate φ(mk) and 1 minute for 55 iteration rounds). As a reference, the conventional ART took with the same PC (2 GHz Pentium 4) about 30 minutes.

The volumes were reconstructed by using different Λ values while other parameters were fixed (including initial guess). Results can be seen on FIGS. 4A to 4C. Notice that when Λ is tightly defined (image 4A), the off-focal shadows produces high-frequency artifacts instead of blurring (image 4C). As described earlier, the clinical task is to define the distance from the jaw ridge to nerve channel, Mental foramen, for right implant planning. Despite the fact that the mental foramen is clearly visible in every case, most clearly it can be seen on image 4A. Furthermore, this test shows that the best subjective image quality is gained with Λ≈±4 mm tolerance, which also matches with our experience of systems tolerances.

Therefore the frequency based ART according the invention works well and is remarkably faster than known ART based on spatial domain iterations and the quality of tomography image is not deteriorated compared to the known ART methods.

The present invention has been described in terms of the preferred embodiment, and it is recognized that equivalents, alternative, and modifications, aside from those expressly stated, are possible and within the scope of the appending claims. For example the instead of the Fast Fourier Transform may be used other transforms, like z-transform, wavelet-transform, or any imaginary or real transform, that enables the iteration to be calculated using inner product or sequential computation.

The invention claimed is:

1. A method of operating a medical tomographic imaging system comprising the steps of:
    radiating an object from at least two different directions and so that at least part of radiation penetrates through the object;
    receiving radiation that penetrates through the object to form a limited amount of one-dimensional or two-dimensional image information of said object;
    storing said limited amount of one-dimensional or two-dimensional image information on a computer readable medium;
    running an iterative reconstruction calculation on a computer processor to calculate two-dimensional or three-dimensional image information from said limited amount of one-dimensional or two-dimensional image information of said object; and
    operating the computer processor to transform said limited amount of image information to a functional transform domain during said method;
    wherein said limited amount of one-dimensional or two-dimensional image information is transformed to a functional transform domain prior to the step of running the iterative reconstruction calculation to enable the iterative reconstruction calculation to be made with matrix element wise multiplication in sequential order to thereby lower the computer cache miss rate during said iterative reconstructive calculation.

2. The method according to claim 1, wherein said iterative reconstruction calculation is made with matrix element wise multiplication in sequential order to thereby lower the computer cache miss rate during said iterative reconstructive calculation.

3. A program stored in a non-transitory computer readable medium configured to run the following method steps:
    forming a limited amount of one-dimensional or two-dimensional image information of an object;
    calculating two-dimensional or three dimensional image information by running an iterative reconstruction calculation from said limited amount of one-dimensional or two-dimensional image information;
    transforming said limited amount of one-dimensional or two-dimensional image information to functional transform domain in a computer processor at some point during said method steps;
    wherein said limited amount of one-dimensional or two-dimensional image information is transformed to functional transform domain prior to said iterative reconstruction calculation to enable the iterative reconstruction calculation to be made with matrix element wise multiplication in sequential order to lower the computer cache miss rate during said iterative reconstruction calculation.

4. The program in a computer readable medium according to claim 3, wherein said iterative reconstruction calculation is made with matrix element wise multiplication in sequential order to lower the computer cache miss rate during said iterative reconstructive calculation.

* * * * *